United States Patent [19]

Sanford

[11] 4,089,107

[45] May 16, 1978

[54] APPARATUS FOR FABRICATING FLAT TRUSSES

[76] Inventor: Arthur Carol Sanford, 2308 Bay Dr., Hillsboro Shores, Pompano Beach, Fla. 33062

[21] Appl. No.: 777,173

[22] Filed: Mar. 14, 1977

[51] Int. Cl.[2] .............................................. B23P 11/00

[52] U.S. Cl. ........................................ 29/798; 29/432; 100/DIG. 13; 269/321 F; 144/288 C

[58] Field of Search ............... 100/DIG. 13; 227/152; 29/432, 432.2, 798; 269/45, 321 F; 144/288 C

[56] References Cited

U.S. PATENT DOCUMENTS

| | | | |
|---|---|---|---|
| 3,241,585 | 3/1966 | Jureit | 144/288 C |
| 3,299,920 | 1/1967 | Koenigshof | 269/321 F |
| 3,868,898 | 3/1975 | Sanford | 144/288 C |
| 3,945,630 | 3/1976 | Brunemann | 269/321 F |
| 4,005,520 | 2/1977 | Sanford | 100/DIG. 13 |
| 4,024,809 | 5/1977 | Moehlenpah | 100/DIG. 13 |

*Primary Examiner*—Lowell A. Larson

*Attorney, Agent, or Firm*—Hamilton, Renner & Kenner

[57] ABSTRACT

Apparatus for fabricating flat wood trusses having parallel chords with web members connected thereto by toothed metal plates. A rigid jig bed is provided on which to assemble the components between a fixed bar on one side of the bed and a laterally movable bar on the other side. Fluid cylinder means mounted on the bed engage the movable bar to clamp the assembled components against the opposite rigid bar. A single stand of pinch rolls at one end of the bed rolls the metal toothed plates into the wood joints and is also adapted to apply toothed metal reinforcing strips to the chords prior to assembly.

8 Claims, 10 Drawing Figures

APPARATUS FOR FABRICATING FLAT TRUSSES

BACKGROUND OF THE INVENTION

A conventional method of fabricating wood trusses with toothed metal plates connecting the joints is to assemble the components on a horizontal bed with plates on the top side of the joints, pass a traveling or gantry pressure roll over the assembled truss, then manually invert the truss, apply plates to the other side of the joints, and pass the roll over the truss a second time, after which the completed truss is slid laterally off the bed. A variation of this method is to apply plates simultaneously to both sides of the joints, pass the traveling roll over the assembly to preliminarily set the teeth, and then pass the assembly through a stationary set of pinch rolls to fully embed the teeth of the plates. This latter method is disclosed in my prior U.S. Pat. No. 3,212,694.

Either of these methods involves two roll passes and excessive time and labor in assembling and handling the trusses.

More recently, I have developed a method and apparatus, as shown in my prior U.S. Pat. No. 3,868,898, whereby the truss components are assembled on a flexible horizontal jig bed designed to fully embed the teeth of the connector plates by a single pass of the bed and truss through traveling pinch rolls. However, this apparatus is complicated and expensive, and requires close tolerances with respect to the relationship between the thickness of the bed and the bight of the rolls.

SUMMARY OF THE INVENTION

The present invention provides improved apparatus which is simple, compact and inexpensive and adapted for a oneman operation in fabricating flat trusses of various heights, without requiring inverting the trusses, with minimum handling, and with a single pass through stationary pinch rolls.

Another object is to provide improved apparatus wherein reinforcing steel strips may be preliminarily applied to the truss chords by the same pinch rolls that set the teeth in the truss joints.

A further object is to provide improved gravity means for delivering the reinforced chords for stacking at the side of the truss assembly bed.

Another object is to provide improved truss clamping means including a fluid pressure operated bar carried on a rigid bar adjustably mounted on the bed for clamping various heights of trusses.

A still further object is to provide laterally spaced guide means between the rolls for resiliently abutting the chords of a truss passing between the rolls.

These and other objects are attained by the improved parts and combinations of parts comprising the present invention, a preferred embodiment of which is shown by way of example in the accompanying drawings and described in the following specification. Various modifications and changes in details of construction are embraced within the scope of the appended claims.

DESCRIPTION OF A PREFERRED EMBODIMENT

Figure 1:
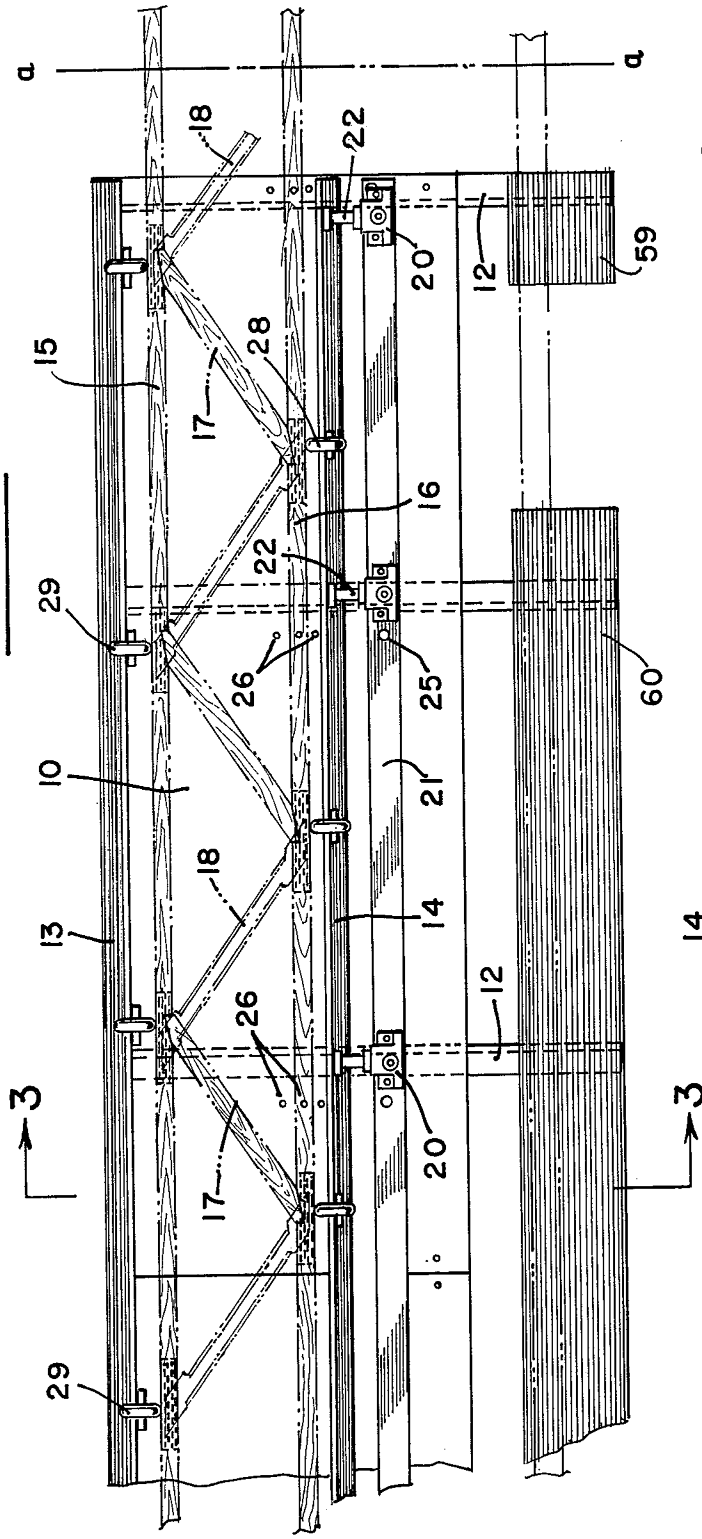
FIG. 1 is a partial plan view of the improved apparatus partially broken away and extending to the left of the reference line a—a.
Figure 2:
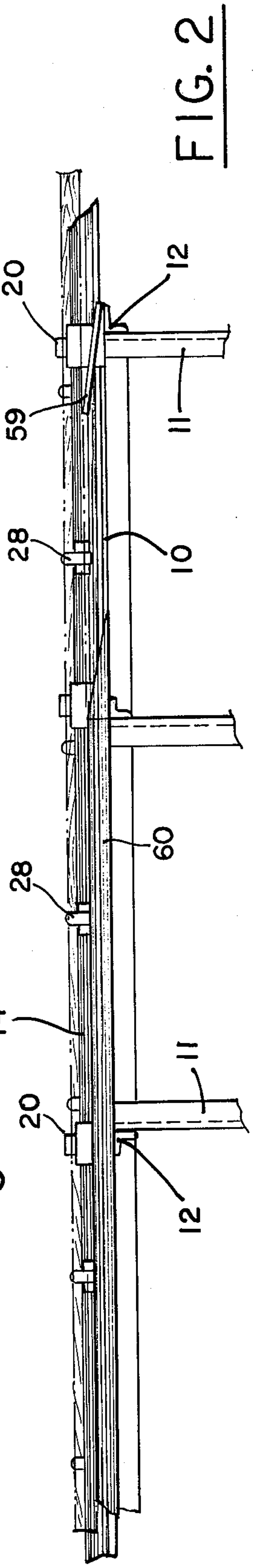
FIG. 2 is a side elevation of that part of the apparatus shown in FIG. 1.

Referring first to FIGS. 1 and 2, a rigid horizontal bed is indicated at 10 and is supported on vertical posts 11 spaced apart longitudinally of the bed and on angles 12 connected to the posts and extending transversely of the bed. Obviously, the bed 10 extends to the left of FIG. 1 a distance adequate to support all spans of trusses being fabricated.

A bar or angle 13 extends longitudinally along the top of one side of the bed 10 and is fixedly mounted thereon. A laterally movable pressure bar or angle 14 extends longitudinally over the other side of the bed, and means hereinafter described are provided for moving the bar 14 laterally to clamp the components of a flat truss between the bars 13 and 14 when the components are assembled on the bed. The truss shown in chain lines by way of example has parallel wood chords 15 and 16, wood web components 17 inclined in one direction and metal web components 18 inclined in the opposite direction.

A truss of this construction is shown in my copending application Ser. No. 759,072, filed Jan. 13, 1977, now U.S. Pat. No. 4,031,686, issued June 28, 1977 and entitled Combination Wood and Metal Truss Structure. In such a truss the metal web members 18 are connected to the chords 15 and 16 by plates having teeth passing through holes in the ends of the web members and into the wood chords. The wood web members 17 have their ends shaped to fit into notches on the inner faces of the chords and toothed plates overlie the notches and connect the members 17 to the chords. The particular truss construction per se forms no part of the present invention.

Figure 3:
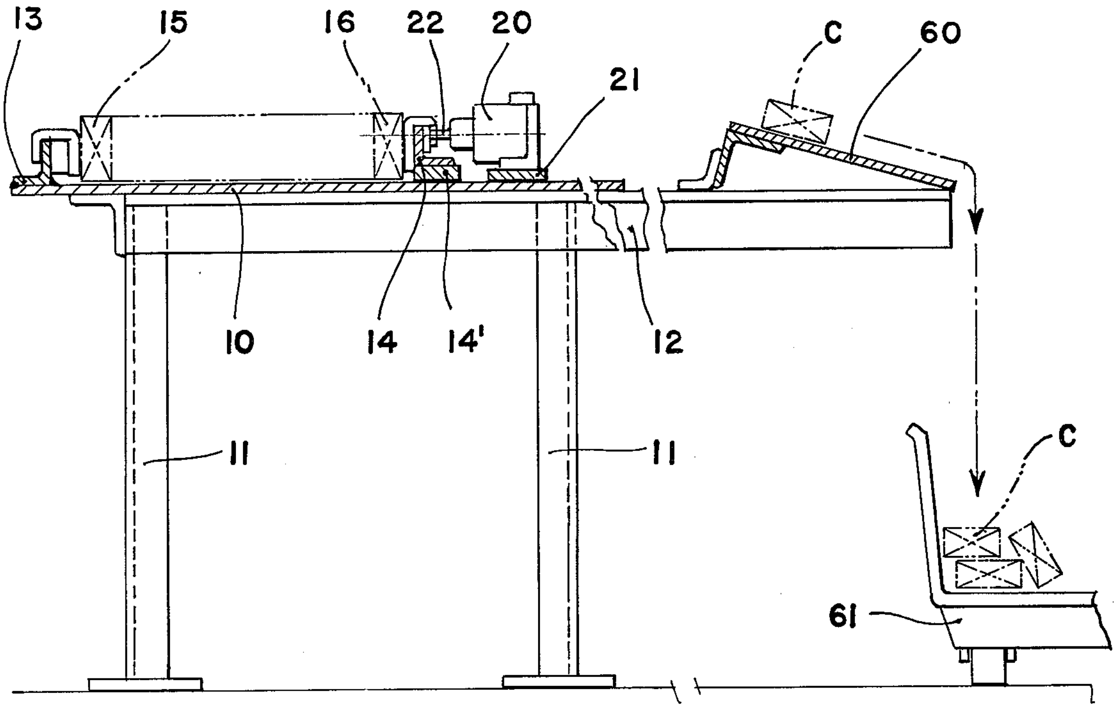
FIG. 3 is a cross-sectional view on line 3—3 of FIG. 1.
Figure 5:
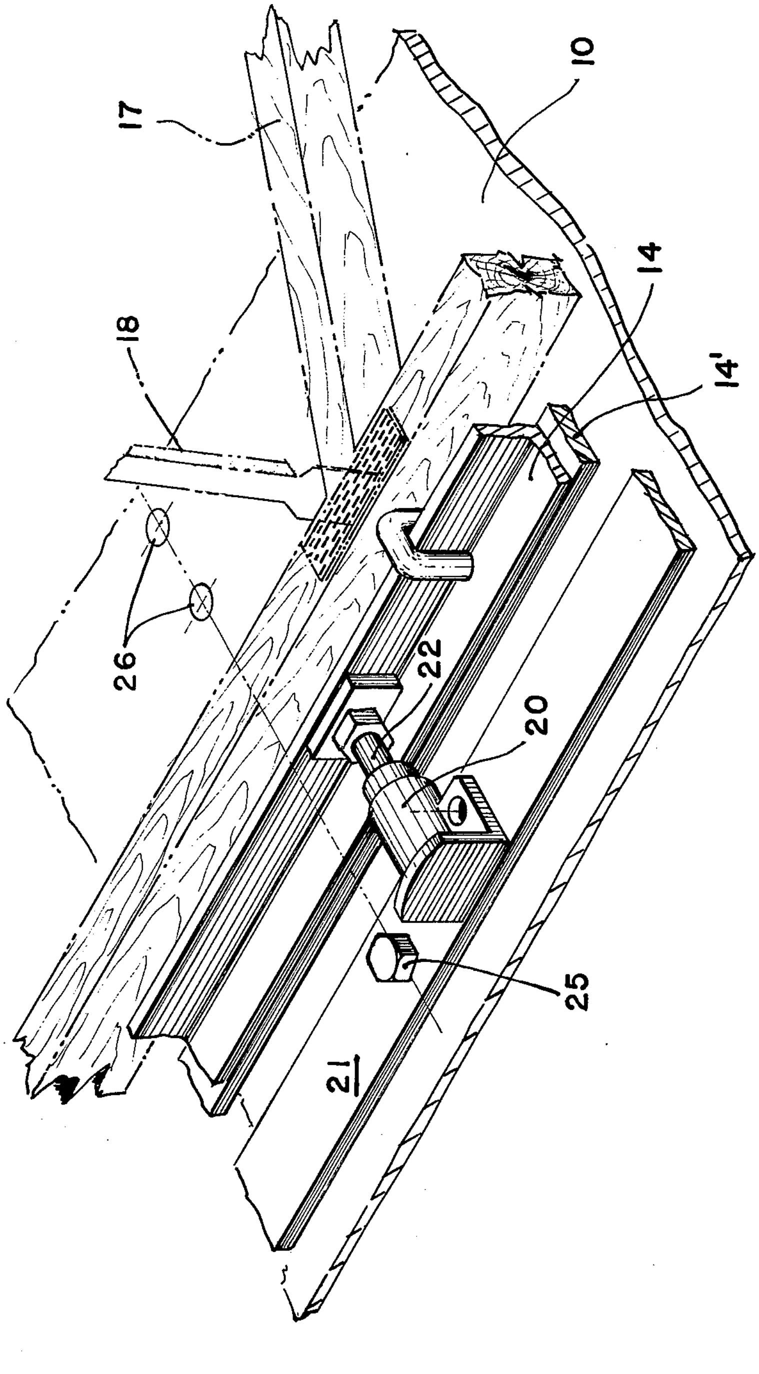
FIG. 5 is an enlarged perspective view showing fragmentarily the manner of mounting fluid cylinders operating the movable pressure bar for clamping the trusses during assembly.

The means for moving the bar 14 laterally preferably comprise longitudinally spaced fluid cylinders 20 mounted on a longitudinal support bar 21 supported on the bed 10, and having their piston rods 22 attached to the vertical flange of the angle pressure bar 14, as shown in FIGS. 1, 3 and 5, and the horizontal flange of bar 14 preferably is attached to a bottom slide bar 14′. The bar 21 is rigidly attached to the bed by bolts or screw studs indicated at 25, and lateral series of bolt holes indicated at 26 aligned with said bolts are provided whereby the location of support bar 21 can be quickly adjusted laterally to accommodate trusses of various widths.

Because the fluid cylinders 20 and the pressure bar 14 attached thereto are mounted on support bar 21, it is a simple matter to laterally adjust the pressure bar for different heights of trusses merely by removing bolts 25, sliding support bar 21 laterally to register the bolt holes in the bar with the desired bolt holes 26, and reinserting bolts 25. This adjustment can be accomplished in a minimum amount of time and with a minimum amount of labor.

In assembling a truss on the bed 10, the operator first tacks a small toothed plate on each end of each wood web member 17 with portions of the plates projecting. The members 17 are then placed in proper location according to guide lines on the bed, with the plates on the undersides. The chords 15 and 16 with their inner faces already notched are then placed in position with the ends of the web members 17 fitting into the notches, and the fluid cylinders 20 are energized to clamp the chords and web components together between the pressure bar 14 and the stationary bar 13. The chords are then tapped with a mallet adjacent to the notches to set the teeth of the projecting plate portions into the undersides of the chords and underlying the notches.

Figure 1A:
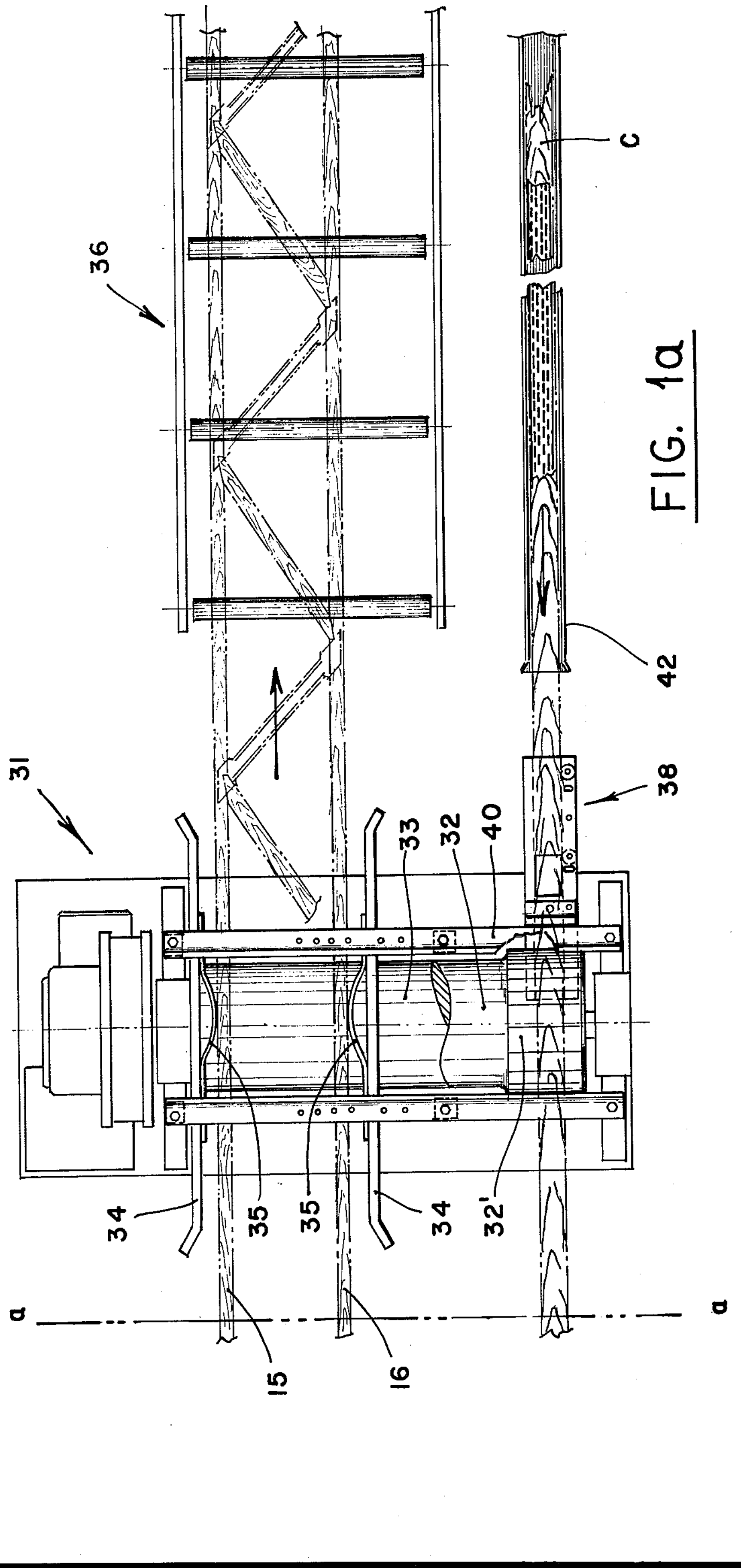
FIG. 1*a* is a partial plan view of the improved apparatus extending to the right of the reference line a—a.
Figure 4:
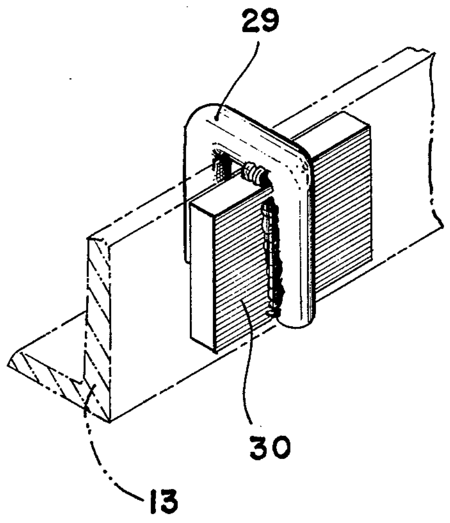
FIG. 4 is an enlarged detail perspective view of one of the camber blocks used on the fixed side bar of the bed.

Next, the metal web members 18 are located on the upper surfaces of the chords with their tooth plates overlying the notches and the plates are tapped to tack the teeth on the leading edges of the plates into the wood, that is, the edges facing to the right toward the rolls (FIG. 1*a*). Preferably, prior to assembly, rounded anti-friction yokes 28 are hooked over the vertical flange of pressure angle bar 14 opposite each joint in chord 16, and similar camber yokes 29 are hooked over the vertical angle of rigid bar 13 opposite the joints in chord 15. These camber yokes have blocks 30 (FIG. 4) of progressively different thicknesses to provide camber in the chord 15 of the truss when clamped, and the chord 16 and abutting pressure bar 14 will flex correspondingly to provide a similar camber in the chord 16.

Figure 2A:
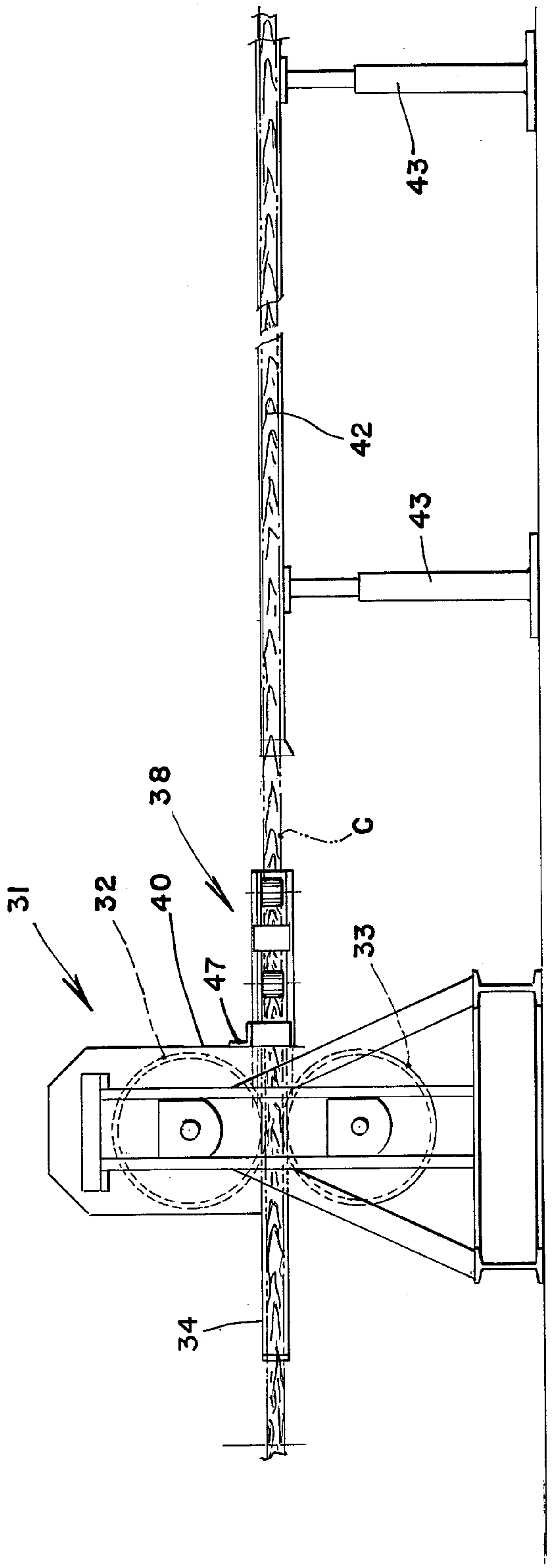
FIG. 2*a* is a side elevation of that part of the apparatus shown in FIG. 2.

After the metal web members 18 have been tacked to set the teeth of the plates joining them to the chords 15 and 16, the cylinders 20 may be deenergized and the assembled truss is slid to the right to pass between the upper and lower rolls of the stationary roll stand indicated generally at 31 in FIGS. 1*a* and 2*a* to fully embed the teeth of the connecting plates into the wood at the joints. The assembled truss differs from the truss of my copending application Ser. No. 759,072 in that the metal web members 18 and their toothed connecting plates are all applied to the top side of the truss, whereas in the truss of the prior application the metal web members are connected alternately to opposite sides of the truss.

I have determined by extensive tests that connecting all the metal webs on one side of the truss with only the small plates connecting the wood webs on the underside and underlying the notches, provides a truss of substantially equal strength to that of application Ser. No. 759,072, and the present truss can be fully connected with only one pass through the pinch rolls and does not require inverting during the assembly operation.

The roll stand 31 comprises upper and lower rolls 32 and 33, respectively, spaced apart to provide a bight equal to the thickness of the finished truss with the connecting plates fully embedded. Longitudinal guide bars 34 extend between the rolls and curved spring plates 35 are secured to the inner faces of the guide bars in the bight area to resiliently abut the chords 15 and 16 of the truss passing therethrough and maintain the proper height of the truss as the teeth of the connecting plates are embedded by the rolls. As shown in FIG. 1*a*, after a truss has passed through the rolls, it may be conveyed on a roller conveyor 36 to a stacking station or the like.

Referring to FIGS. 1*a*, 2*a* and 6 – 8, there is shown guide means on the rear or trailing side of the roll stand 31 for feeding truss chords flatwise through the rolls 32 and 33 to apply toothed reinforcing metal strips to one or both faces of the chords prior to their assembly on the bed 10. For this purpose, the rolls 32 and 33 are reversely driven and have portions 32' and 33' of enlarged diameter at one end to provide a narrow bight for rolling the chords in flatwise position by reverse rotation of the rolls, as distinguished from their edgewise position in the assembled trusses passing through the guides 34 between the rolls.

Guide means indicated generally at 38 is mounted on the rear of the roll stand frame 40 in alignment with the bight between the enlarged portions 32' and 33', and a longitudinally aligned guide channel 42 extends rearwardly thereof and is supported in horizontal position on posts 43. The chords C are laid flatwise in channel 42 with a toothed reinforcing steel strip 44 having its leading edge tacked to one or both faces of the chord and pushed into the guide means 38.

The guide means 38 is of rectangular cross section and has top and bottom plates 44 and 45, respectively, connected to a rigid vertical guide plate 46 along one side. The guide means is vertically adjustably mounted on the roll stand frame 40 by an angle bracket 47 attached to the top plate 44 by bolts 48 and having vertical bolt slots 49 in its vertical leg. On the opposite side of the guide means longitudinally spaced guide rollers 50 are journaled in top and bottom bars 51 which are laterally adjustable on the top and bottom plates 44 and 45 by screws 52 in slots 53.

Figure 7:
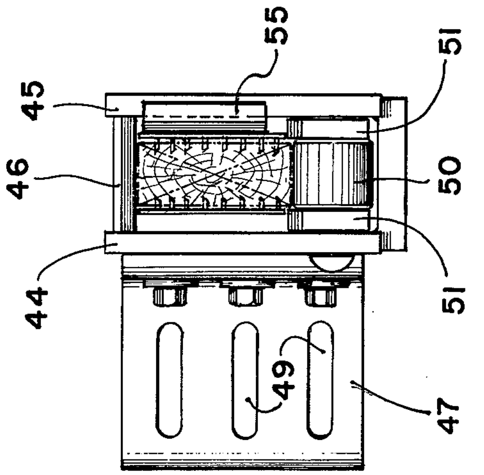
FIG. 7 is an end view thereof.
Figure 6:
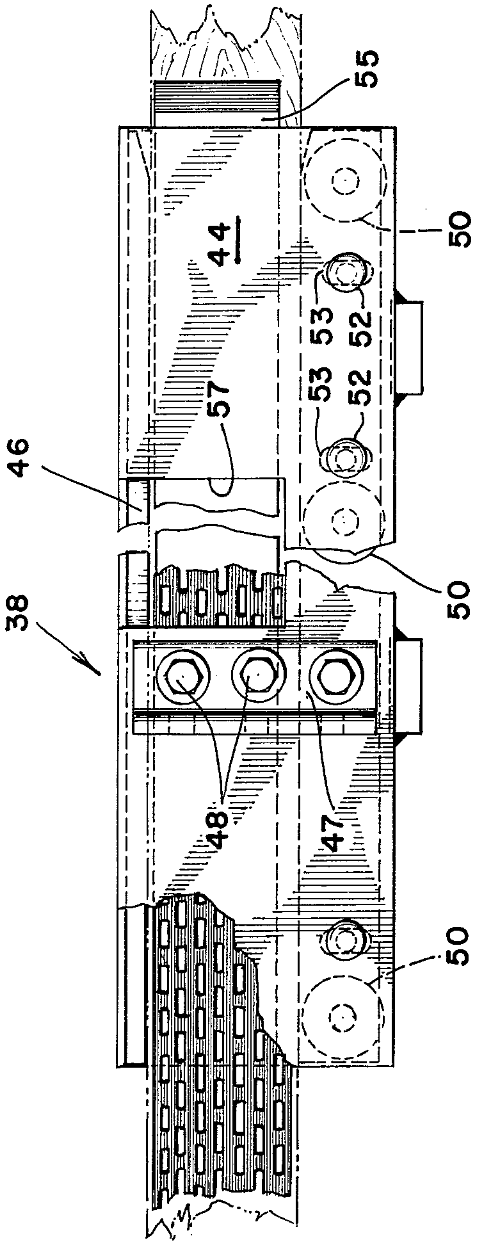
FIG. 6 is an enlarged partial plan view, partly broken away, of the improved tubular guide means for guiding chords with reinforcing strips into the rolls.
Figure 8:
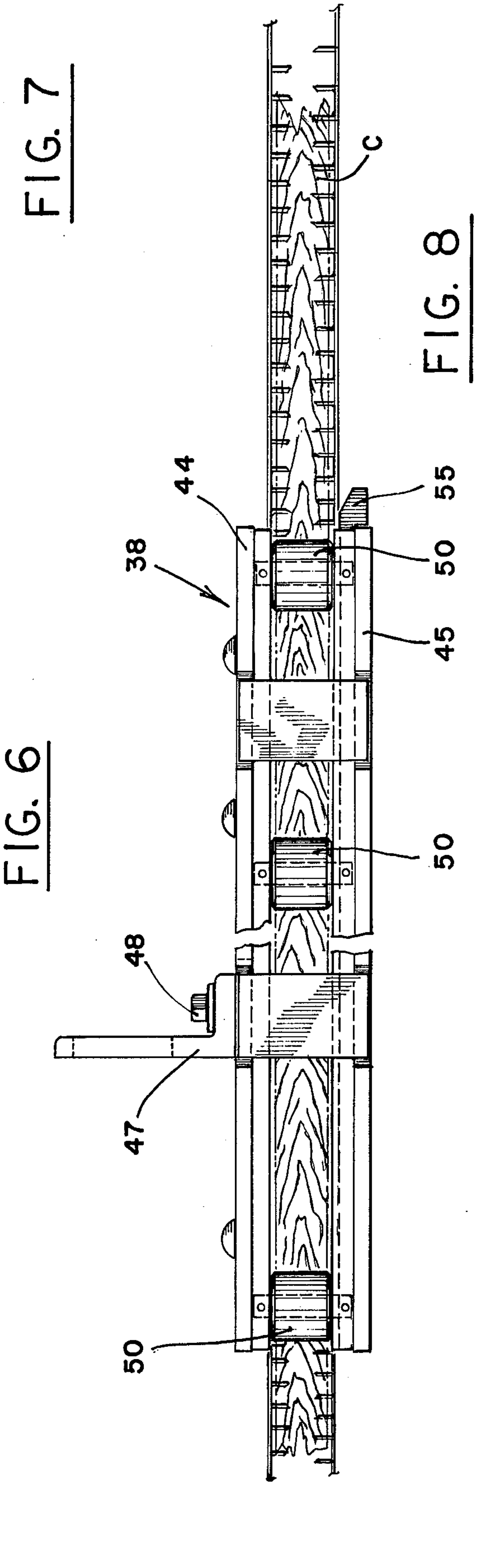
FIG. 8 is a side elevation thereof.

As best seen in FIG. 7, the bottom plate 45 carries a support plate 55 for slidingly supporting the bottom face of the chord C or a reinforcing strip 44 tacked thereon, and the guide rollers abut one side of the chord to press the other side against guide plate 46. At the same time the side edges of the top and bottom bars 51 slidably abut one side edge of the top and bottom reinforcing strips 44 to hold the opposite side edges of the reinforcing strips against the vertical side bar 46. Thus the reinforcing strips are held in substantial alignment with the chord C.

Preferably, an access opening 57 is provided in the top plate 44 to inspect the alignment of the reinforcing strips with the chord, so that in the case of uneven or warped chords a lateral adjustment of the guide rollers can be made.

When the chords C with the reinforcing strips 44 applied thereto pass from the rolls 32 and 33 to the left, as viewed in FIGS. 1 and 1*a*, they slide first over the longitudinally inclined deflecting plate 59, which deflects the leading edge of the chords upwardly, and then slide longitudinally along the laterally inclined gravity dump plate 60 carried on extensions of bed support angles 12. As seen in FIG. 3, as the chords slide over the dump plate they gradually slide laterally by gravity and then fall to accumulate in a storage pile on the floor or on a hand truck 61 at the side of assembly bed 10 in readiness for the truss assembly operation.

The improved apparatus is adapted for operation by one man. If a run of a certain number of flat trusses is to be fabricated the operator first applies the reinforcing steel as required to chords C of the proper length by pushing the chords with the strips laid on their faces through guide channel 42 and guide means 38 into and through the rolls in the manner previously described to accumulate the number of chords necessary to complete the run. It will be understood that if spliced lengths of chords are required the splicing is done prior to passing the chords through guide channel 42.

The operator then lays the chord and wood web components on the bed in proper arrangement, actuates the pressure bar to clamp them in position, applies the metal webs and top connecting plates, and then pushes the assembled truss through the pinch rolls to completely embed the teeth and complete fabrication, all as previously described.

The improved machine is simple, compact and inexpensive, does not require inverting the trusses, and requires only a single pass through the pressure rolls to completely embed the teeth of the connecting plates. Adjustment of the pressure bar assembly for various heights of trusses is quickly and easily accomplished.

What is claimed is:

1. Apparatus for fabricating flat wood trusses having parallel chords and web components joined to the chords by toothed metal plates, comprising a rigid elongated truss assembly bed, a fixed pressure bar extending along and mounted on one side of said bed, a laterally movable pressure bar extending along the opposite side portion of said bed, a support bar laterally adjacent to and substantially coextensive with said pressure bar, fluid pressure means on said support bar connected to said pressure bar for clamping a truss assembled on the bed between the movable pressure bar and the opposing fixed pressure bar, said support bar being laterally adjustably mountable on said bed at a series of positions, whereby the fluid pressure means and the movable pressure bar carried thereby are selectively located for clamping various heights of trusses, and a stationary stand of pinch rolls at one end of said bed through which a truss assembled on the bed may be passed to embed the teeth of the joining plates into the wood.

2. Apparatus as defined in claim 1, wherein laterally spaced longitudinal guides extend between the pinch rolls, and curved spring plates are mounted on the inner faces of said guides at the bight area between the rolls for resiliently abutting the chords of a truss passing through the rolls.

3. Apparatus as defined in claim 1, wherein said pinch rolls are adapted at one end to roll a reinforcing toothed metal strip on at least one face of a truss chord prior to assembly on said bed, and a laterally inclined chord supporting and gravity dumping plate is supported along one side of said bed for receiving reinforced chords from said rolls rotated in reverse direction.

4. Apparartus as defined in claim 1, wherein said pinch rolls are reversible and adapted at one end to roll a reinforcing toothed metal strip on at least one face of a truss chord prior to assembly on said bed, and tubular guide means mounted on said roll stand for holding said metal strip longitudinally aligned with said chord at the rear entrance to the bight of the rolls.

5. Apparatus as defined in claim 4, wherein said tubular guide means has side rollers for abutting one side of the chord and side guide plates for simultaneously abutting the edges of the metal strips.

6. Apparatus as defined in claim 2, wherein said pinch rolls are adapted at one end to roll a reinforcing toothed metal strip on at least one face of a truss chord prior to assembly on said bed, and a laterally inclined chord supporting and gravity dumping plate is supported along one side of said bed for receiving reinforced chords from said rolls rotated in reverse direction.

7. Apparatus as defined in claim 6, wherein tubular guide means is mounted on said roll stand for holding said metal strip longitudinally aligned with said chord at the rear entrance to the bight of the rolls.

8. Apparatus as defined in claim 7, wherein said tubular guide means has side rollers for abutting one side of the chord and side guide plates for simultaneously abutting the edges of the metal strips.

* * * * *